United States Patent [19]
Harp et al.

[11] Patent Number: 5,524,479
[45] Date of Patent: *Jun. 11, 1996

[54] DETECTING SYSTEM FOR SCANNING MICROSCOPES

[75] Inventors: Robert S. Harp, Westlake Village; David J. Ray, Agoura Hills, both of Calif.

[73] Assignee: Ouesant Instrument Corporation, Agoura City, Calif.

[*] Notice: The term of this patent shall not extend beyond the expiration date of Pat. No. 5,388,452.

[21] Appl. No.: 377,191

[22] Filed: Jan. 24, 1995

Related U.S. Application Data

[63] Continuation of Ser. No. 137,625, Oct. 15, 1993, Pat. No. 5,388,452.

[51] Int. Cl.[6] ............................. G01B 5/28; H01J 37/26
[52] U.S. Cl. .................. 73/105; 250/306; 250/307
[58] Field of Search .................. 73/105; 250/306, 250/307, 423 F

[56] References Cited

U.S. PATENT DOCUMENTS

| | | | |
|---|---|---|---|
| 5,025,658 | 6/1991 | Elings et al. | 73/105 |
| 5,144,833 | 9/1992 | Amer et al. | 73/105 |
| 5,189,906 | 3/1993 | Elings et al. | 73/105 |
| 5,245,863 | 9/1993 | Kajimara et al. | 73/105 |
| 5,267,471 | 12/1993 | Abraham et al. | 73/105 |
| 5,286,977 | 2/1994 | Yokoyama et al. | 73/105 |
| 5,388,452 | 2/1995 | Harp et al. | 73/105 |

*Primary Examiner*—Richard Chilcot
*Assistant Examiner*—George M. Dombroske
*Attorney, Agent, or Firm*—Marvin H. Kleinberg; Marshall A. Lerner; Michael J. Ram

[57] ABSTRACT

A scanning probe microscope is provided with a piezo-ceramic tube to carry the sensitive probe at its free end to translationally move the probe in the X and Y directions. Large stationary surfaces can then be scanned by probe tip motion. The tube is also capable of movement in the Z direction so that the tip can follow the contours of the surface. Optical detection means track the motion of the probe tip and generate signals corresponding to and representative of surface contours. In one mode of operation, the signals are used in a feed back loop to keep constant the spacing between the tip and the surface, in which case the error or control signals represent the contours.

31 Claims, 2 Drawing Sheets

DETECTING SYSTEM FOR SCANNING MICROSCOPES

This is a continuation of application(s) Ser. No. 08/1,37, 625 filed on Oct. 15 1993, U.S. Pat. No. 5,388,452.

The present invention relates to scanning probe microscopes and, more specifically to scanning force microscopes, sometimes referred to as atomic force microscopes.

BACKGROUND OF THE INVENTION

Scanning force microscopes (SFM), sometimes referred to as atomic force microscopes (AFM) are used to investigate the surfaces of matter in the micrometer, nanometer, and sub-Angstrom scale. Such microscopes operate by positioning a probe, consisting of a cantilever arm with a sharp tip located orthogonally on one end of the cantilever arm, in, or nearly in, contact with the surface to be profiled or otherwise examined.

The cantilever arm has such a small spring constant that typically one nanonewton of force will cause a noticeable deflection. The cantilever arm deflects due to natural forces present between the tip and the sample. The probe may be either attracted to the surface or repelled by the surface depending on the forces at work. When relative motion in the X and Y directions exists between the probe and the sample surface, the cantilever arm will bend as topographical features of the sample move under the tip.

Typical prior art is described in U.S. Pat. Nos. 4,724,318 and 4,800,274. In these patents, microscopes are described in which the detection of cantilever arm bending is accomplished by a second probe which is suspended over the first probe. The second probe detects changes in a tunneling current flowing from the first probe to the second probe. Measurable changes in this tunneling current result when the distance between the first probe and the second probe changes as the cantilever portion of the first probe moves up and down in response to the presence of topographical features of the sample moving under the first probe tip.

Subsequent patents of the prior art describe optical detectors which use only a first probe and use either light interference or light beam deflection (optical lever) to detect the bending of the probe cantilever arm due to the interaction of the forces between the surface and probe tip. The interference method is described by Y. Martin, et al, in the publication, J. Appl. Phys. 61,4723, (1987).

The optical lever method is described by O. Marti, B. Drake, and P. K. Hansma, in the publication Appl. Phys. Letters 51,484 (1984). Further, U.S. Pat. Nos. 4,935,634 and 5,025,658 describe optical detection schemes in which a sample is moved in a rastered motion under the probe.

The optical lever method of detecting the probe deflection utilizes a narrow beam of light directed toward the probe. Probe deflections caused by the changing topography of the sample surface result in changes in the angle of the reflected light beam. This change is detected by means of photo-diodes. The light source may be a laser device. A pair of photo-diodes are placed in close proximity to each other and form a bicell.

As the reflected light from the probe shines on the diodes, and as the probe cantilever arm moves up or down, the proportion of the light on each of the photo-diodes will change. This change is used to determine the amount of bending of the cantilever arm, thus indicating a change in the relative distance or force between the probe tip and the surface being examined.

The prior art also teaches that the sample, whose surface is to be examined, may be attached to a motion controlling device, typically a piezoelectric cylinder, the end of which moves the sample back and forth in both the X and Y directions in a tastering motion underneath the probe. Further, using the signals generated by the photo-diodes, the device moving the sample in X and Y may also control the Z direction, or height.

The photo-diode signals are typically subtracted to create a difference signal. The set-point value will then establish a constant probe deflection value. The subtraction of the difference signal from the set-point value results in an error signal. This signal is routed through feedback conditioning means to create a correction signal.

The feedback conditioning means may be either an analog circuit or a digital circuit using computing means such as is described by Hanselmann in "Implementation of Digital Controllers —A Survey" Automatica, Vol. 23 No 1, 1987. Digital control also is described in U.S. Pat. No. 4,889,988 dated Dec. 26, 1989, reissued as U.S. Pat. No. RE 34,331 on Aug. 3, 1993.

The correction signal is, in turn, routed to the motion control device such that the control device keeps the cantilever arm at a constant bend angle. Consequently, the force between the probe tip and the sample surface remains essentially constant even though the topography of the sample is changing under the probe tip.

Stated differently, the probe cantilever arm is maintained at a constant deflection. The correction signal is then an indication of the surface profile. The correction signal may also be filtered or conditioned to produce a second signal which can enhance certain surface profile features.

The prior art system thus described provides X and Y raster signals and a Z signal indicating the surface profile. These three signals are sufficient to give surface topographical information. Persons skilled in the art recognize that the signals thus generated can be digitized and displayed by a computer with the topography displayed in various representations.

Certain distortions in the image can be corrected in computer software. Software algorithms can be employed to correct curvature in the image caused by the arc traced by the probe as it swings from side to side instead of traversing the surface of the sample in a flat plane, as would be the ideal case.

The prior art system thus described has several shortcomings. Since the sample is moved, and as each sample may have a different mass, it may be necessary to change the feedback loop parameters, or the raster speed, or both with changes of sample in order to preserve loop stability. Also the motion producing device has only limited available force to move the sample. Therefore, large samples can only be examined when cut or broken into smaller fragments.

It would, therefore, be desirable to have the probe move over the sample in a rastering fashion, rather than moving the sample under the probe. As the probe moves in X and Y directions, it will be deflected in the Z (vertical) direction as it passes over the surface features. With prior art beam deflection (optical lever) systems this is not possible, since the raster motion of the probe moves the probe away from (out of) the light path thereby depriving the photo-diodes of information representing the signal. The feedback loop is also isolated from the optical information relating to the probe motion.

Although it is possible to make the light spot so large that the probe can always remain inside the circle of light, even when the probe is rastered, reflections from the sample surface will interfere with the portion of light reflected from the probe. Moreover, the light energy density inside the circle must be constant. With a large light spot, the intensity of reflected light may be so low as to require image intensifiers at the photodiode.

In variations of the prior art, the cantilevered portion of the probe may be intentionally excited into resonance by signals to the motion controller. In this case, as the probe tip is brought near the surface, the resonance changes and this change is used to generate a signal which controls the feedback loop to the motion controller.

This form of the prior art has advantages since the topology of the surface may be measured with less lateral force on the tip. Consequently, with some samples, the resultant image is a more accurate representation of the surface. The reduced lateral force results from the fact that the tip is momentarily pulled away from the surface during one half of the oscillatory cycle. Should the tip encounter a steep vertical feature on the sample surface, it does not experience as much lateral force since it is further away from the surface.

SUMMARY OF THE INVENTION

According to the present invention a scanning force microscope utilizes means for steering the light beam to follow the raster motion of the probe. Means are provided to correct for the aberrations that would otherwise appear in the image signal due to the changing incident angle of the light beam on the probe. In one variation of the present invention a non-moving image of the moving probe is produced by optical components of the device used to steer the light beam.

The means for steering the light beam may include a lens combined with a motion controller. The motion controller is preferably in the shape of a cylindrical piezo-ceramic tube and means for moving the tube may reside inside the tube. A lens is positioned inside the tube such that the light beam is directed toward the moving cantilever arm. The means for steering the light beam may also include a mirror combined with the motion controller such that the light beam is directed toward the moving cantilever arm.

The path of the beam, as it is reflected back from the probe, is controlled such that an image of the probe is formed at a separate location. The lens focuses the incoming light beam on or nearly on the probe. The reflected light in this case is reflected at twice the incident angle of the incoming light beam.

The lens diameter is large enough so that the reflected light beam passes through the edge of the lens and is refracted and refocused. Additionally, if the reflected light is focused at or near a special position inside the tube, the image of the probe does not appear to move or to substantially move in the lateral direction, even though the probe itself is moving laterally.

This special position is determined by calculating the arc shaped by the piezo-ceramic tube when its tip is deflected from the rest position. Next, a tangent to the arc is drawn such that it touches the arc at the probe point. A similar tangent when the tip is deflected to a different point is then calculated. The intersection point of the two tangents indicates the position where the optical steering system should create an image of the probe.

Directing the light beam to follow the movement of the probe results in a change in the position of the light spot on the photo-diodes. Ordinarily such a change results from the change in the deflection angle of the probe as it follows changes in the Z value of the surface features. The changes in photo-diode output resulting from a change in Z are interpreted as the Z value for the subsequent image generation.

Since a change also results from the light beam following the X and Y motion of the probe, it follows that there can be a false value which is added to the resulting image. This change of photo-diode output due to the changing angle of the laser beam, however, is very small compared to the change in probe angle caused by the relative motion between the sample surface features and the probe.

Further, even the small amount of image distortion caused by the X and Y motion of the light beam as it follows the probe can be corrected. Means for correcting this aberration may be a computer and software algorithm which processes the aberrated signal after that signal is generated by the photodiodes. This software algorithm utilizes the known X and Y raster signal values and the Z value reported by the feedback system. The algorithm makes a correction in the image value for Z.

Since the angle causing the distortion for any particular X and Y value is known, the apparent change in Z due to the change in reflection angle caused by the displacement in X or Y can be calculated. The result can be added to or subtracted from the apparent Z value to give a true Z value.

The advantages of the present invention and its variations are most evident when changing from one sample to another sample with a different mass. Since the mechanical parameters of the feedback loop remain essentially constant in the present invention, it is not necessary to experiment with new feedback loop parameters for each sample change. Further, the force microscope may now be used to image samples of virtually any size without the need to cut or break the samples into the small low mass size that can be translated or rastered by the prior art devices.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

DETAILED DESCRIPTION OF THE DRAWINGS

Figure 1:
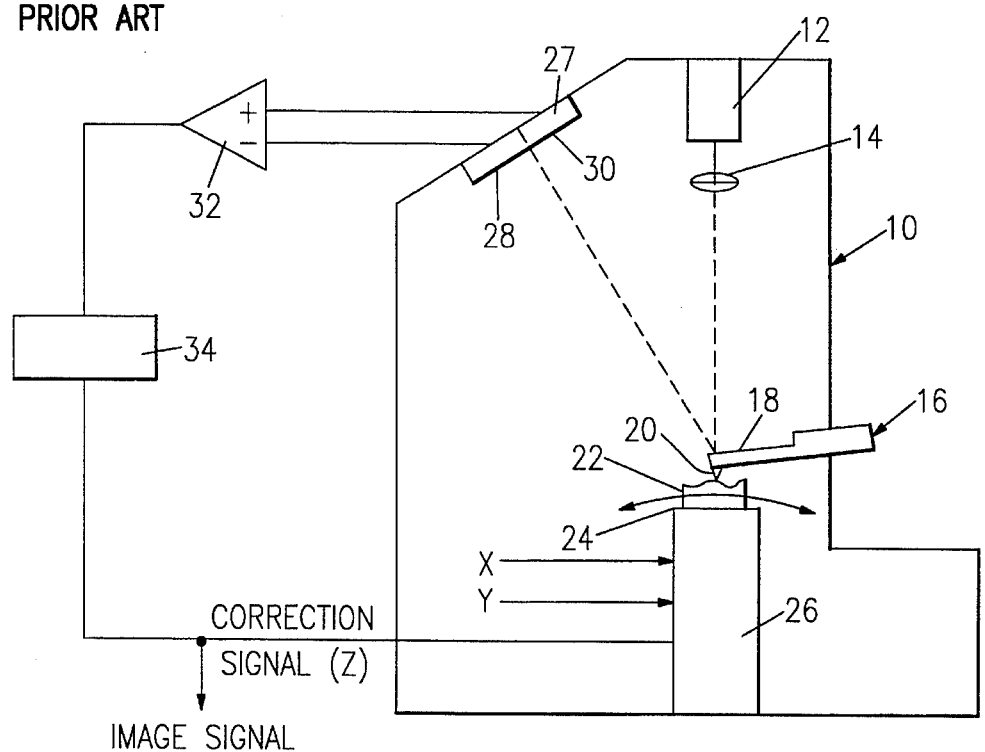
FIG. 1 is a simplified diagram of a prior art microscope using a laser beam deflection system.

Referring to FIG. 1, a scanning force microscope system 10 according to the prior art is shown. As seen, a light source 12 which may be a laser, directs its light to a lens 14. The light beam is focussed on a probe 16 which takes the form of a lever 18. The lever 18 is mounted such that it does not move in the lateral or X and Y directions but is capable of motion in the vertical or Z direction. The lever 18 has a pointed tip 20 on the side facing a sample 22.

The sample 22 is mounted on a free end 24 of a piezo-electric element 26 which, in this embodiment, has a cylindrical shape and is capable of motion in the vertical or Z direction. The focussed light beam reflects from the free end of the lever 18 and is directed to a photo-diode bicell 27 which includes a first photo-element 28 and a second photo-element 30. These photo-elements may be photo diodes.

Probe motion in the vertical or Z direction is detected when the reflected light beam moves from one photo-element 28 to the other element 30. Signals from the photo-detector elements 28,30 are applied to a differential amplifier 32 to form a difference signal which is applied to a feedback system 34.

The feedback system 34 generates a correction signal which is applied to the piezo-electric element 26 to cause it to expand or contract in the Z direction in a predetermined manner in order to maintain a desired spacing or force between the probe tip 20 and the sample 22. The correction signal sent to the piezo-element 26 may also be used as an indication or representation of the surface topography of the sample 22.

Figure 2:
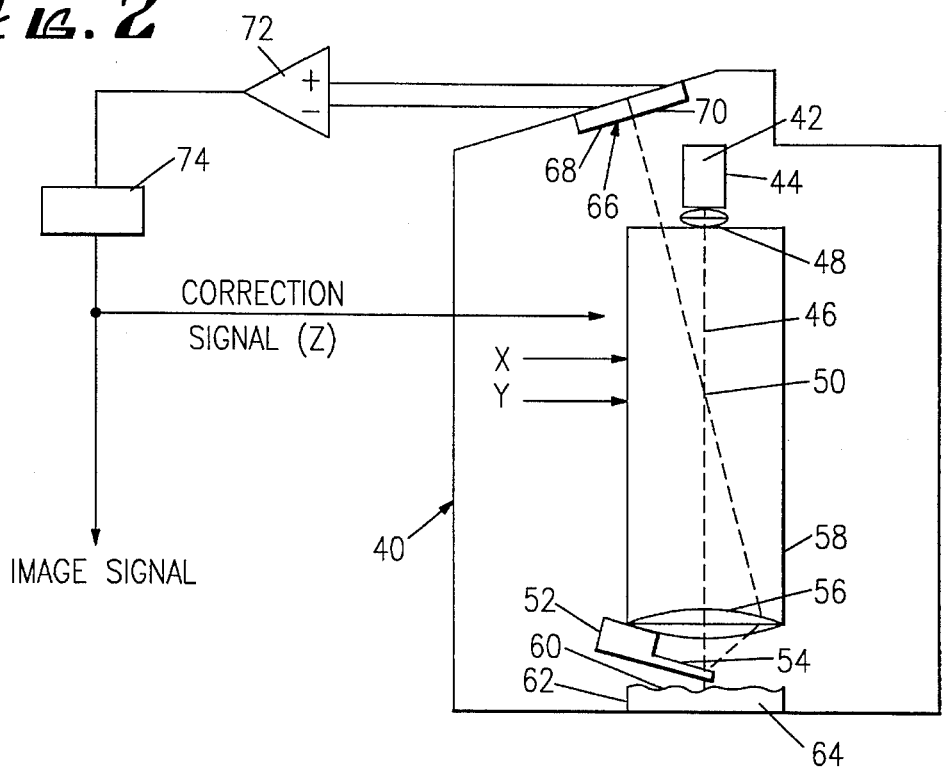
FIG. 2 is a diagram of a scanning microscope system according to the present invention.

The present invention is described with reference to FIG. 2. A force microscope system 40 includes a light source 42, preferably a laser 44. The laser 44 output beam 46 is directed through a lens 48. The lens 48 allows the beam to be focused at or near a point 50 where the reflected light intersects with the directed light.

The light beam 46 diverges after it passes point 50 and is further directed through a second lens 56 which focuses the light on or near a probe 52 which has a scanning tip and a lever 54 with a reflective upper surface. The second lens 56 is mounted in a scanning element 58, the free end of which is capable of translational motion substantially in the X-Y plane as well as motion in the vertical or Z direction.

The returning beam is then returned to point 50 which has been chosen to be the location where an image of the probe 52 is formed. Point 50 is further chosen to be located at a point where the image of the probe 52 does not appear to move in either the X or the Y direction even though the probe 52 and the second lens 56 can move in both the X and Y directions. This point is the point where tangents to the arc traced by the bending axis of the scanning element 58, intersect when such tangents are drawn from the point where the scanning element 58 axis and the lever 54 intersect.

The scanning element 58 is in the form of a cylinder which "bends" relative to a central axis under the influence of applied X and Y raster signals. The probe 52 is attached at the "free" end of the scanning element 58 and is consequently "rastered" over the surface 60 of a sample 62 by the bending motion of the scanning element 58. The lens 56 also moves as a result of its attachment to the scanning element 58.

The sample 62 is fixed to a base 64 and need not move. The light beam 46 is reflected off the reflective surface of the lever 54 and is directed back through the edge of the correcting lens 56. The lens 56 directs the light beam 46 to refocus at or near point 50 which subsequently begins to diverge.

Light beam 46 then proceeds to impinge upon a detector 66 which is comprised of photo-detector elements 68, 70. The signals from the photo-detectors 68, 70 are subtracted from each other in a difference amplifier 72. A difference signal is formed which is in turn applied to a feedback circuit 74. After proper conditioning, a correction signal is generated which drives the scanning element 58 in the Z direction to maintain proper distance and/or force between the tip of lever 54 and the sample surface 60.

Figure 3:
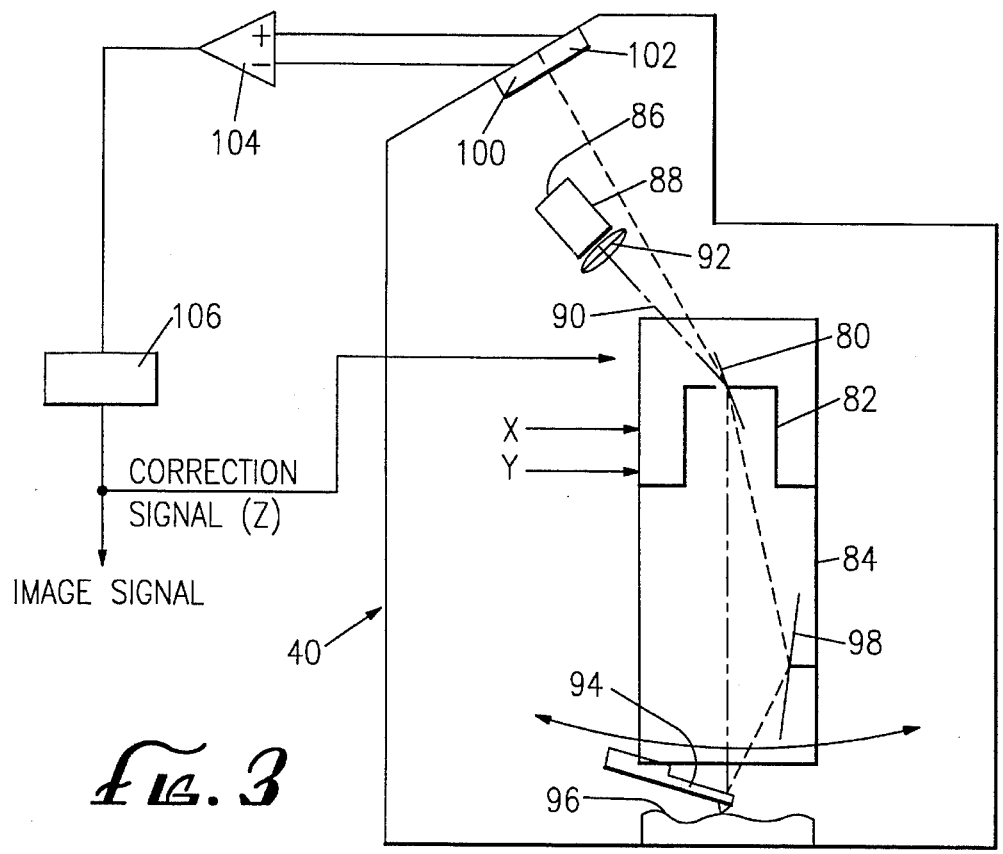
FIG. 3 shows an alternative embodiment of a microscope system according to the present invention.

FIG. 3 Shows an alternative embodiment of the present invention which utilizes an upper mirror to permit off axis placement of a light source. In this embodiment, a first mirror 80 is mounted to a structure 82 which is mounted to a scanning device 84. Scanning device 84 is a piezo-electric cylinder which bends relative to a central axis under the influence of applied X and Y raster signals thereby moving the free end in the X and Y directions. The scanning device 84 can also be made to move in the vertical or Z direction, as well.

A light source 86, preferably a laser 88, creates a light beam 90 which is directed through a lens 92. Lens 92 focuses the beam 90 at or near the reflective upper surface of a probe lever 94. Probe lever 94 is mounted to the free end of the scanning device 84.

Mirror 80 is located in a specified position within the structure 82 such that it does not (or nearly does not) translate in directions X and Y with the bending of the scanning device 84. However, mirror 80 rotates as the scanning device 84 bends. As a result of this rotation, the beam 90 moves in such a fashion as to follow the probe lever 94 as it translates in directions X and Y over a sample 96 which is rigidly attached to a base (not shown).

The reflected light beam returns from the probe lever 94 at a reflected angle which is equal to the incident angle of the light beam on the probe lever 94. This reflected beam strikes a mirror 98 which is attached to the scanning element 84. In this manner the reflected beam returns to the upper first mirror 80 and is then directed to the photo-diodes 100 and 102.

Photo-diode signals are sent to difference amplifier 104. The difference signal output is applied to feedback element 106 whose output signal may be considered a correction signal for the Z motion of the scanning element 84. Alternatively, this signal may be used as the image signal corresponding to the Z displacement of the probe lever 94. The secondary mirror 98 may be replaced by an optical wedge to produce the same effect by refracting light back toward the upper mirror 80.

Figure 4:
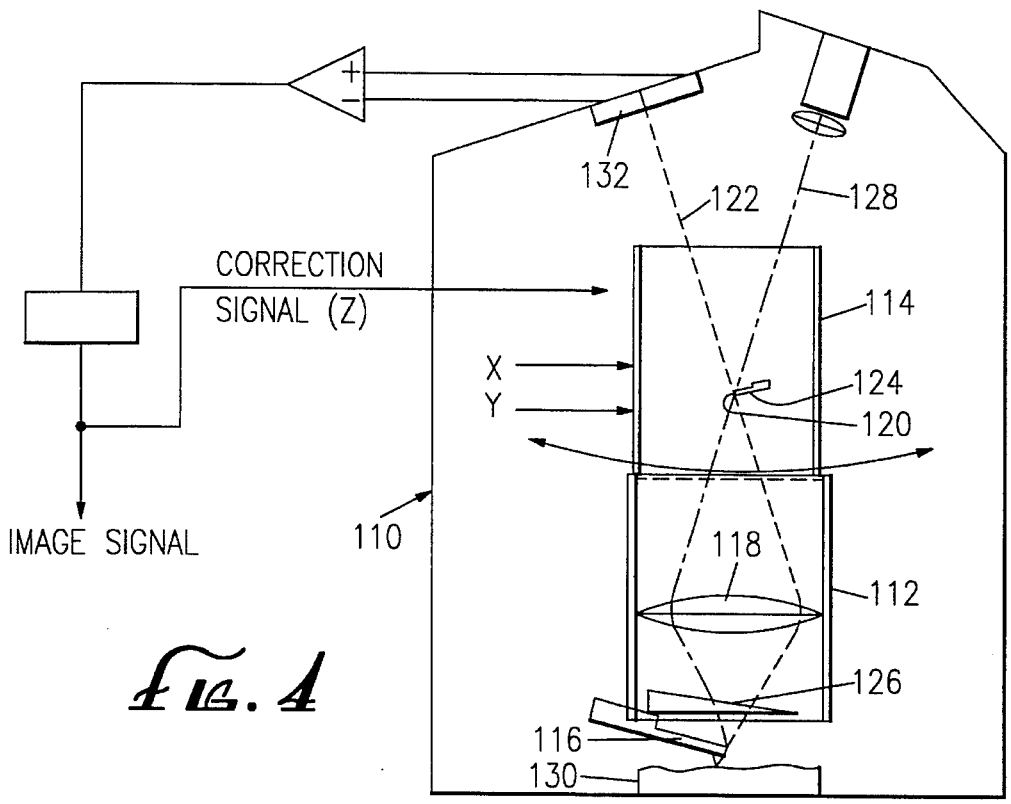
FIG. 4 shows a second alternative embodiment of a microscope system according to the present invention.

FIG. 4 shows a second alternative embodiment of a scanning force microscope 110 according to the present invention. In this embodiment, an extender 112, which in itself does not distort under the raster signals X and Y or under the Z signal, is attached to a scanning device 114. The extender 112 serves two purposes. It extends the X and Y motion range of a probe lever 116 which is mounted to the free end of the extender 112 and it is a support for a lens 118.

In this way, the lens 118 and the probe lever 116 rotate about a fixed point 120 as the scanning device 114 moves in the X and Y directions.

As in other embodiments a reflected beam 122 forms an image 124 of the probe lever 116 at a point which does not appear to move in the X and Y directions, notwithstanding that the probe lever 116 moves in the X and Y directions. In this embodiment, a wedge shaped optical element 126 has added to offset and rotate the incoming light beam 128 as well as the light beam 122 which is reflected from the probe lever 116. This rotation compensates for the angle from the horizontal at which probe lever 116 may be mounted. Such an angle is convenient in order to prevent points of the probe lever 116 other than the tip from touching the sample 130 surface. By positioning light beam 128 on one side of the lens 118, the optical element 126 can be eliminated.

As will be appreciated by those skilled in the art, this rastered probe scanning force microscope 110 can be placed on large structural samples 130 and can then be used to image various areas of the surface of large objects such as mirrors, lenses, and structural members, by scanning locally at selected locations to investigate the surface features with the probe lever 116.

The rastered probe force microscope 110 can be mounted on a support structure (not shown) which, in turn, can rest on the sample 130 and can be moved around over the sample 130. By this method, composite mosaic images can be created from the surface of very large samples.

In further variations of the present invention, four or more photo-diodes 132 can be employed such that twisting or torque applied to the probe lever 116 can be detected, as well as any vertical deflection of the probe lever 116, as described above.

The present invention may also be used with means for exciting a probe into vibration at or near its resonant mode such that, as the probe nears the sample surface, changes in the resonant parameters (such as amplitude or phase) may be detected and used as a signal to control the Z displacement of the scanning device.

Others skilled in the art may devise different and alternative embodiments of the present invention. Accordingly, the scope of the invention should be limited only by the claims presented below.

What is claimed as new is:

1. A scanning force microscope device comprising in combination:
   a. a sensing probe having a substantially reflective surface on one side and a scanning tip on the opposite side, said tip adapted to be positioned adjacent a surface to be scanned;
   b. illuminating means for generating a radiant energy beam and for applying said beam to said reflective surface;
   c. position control means coupled to said sensing probe for moving said scanning tip substantially parallel to a surface to be scanned in a predetermined pattern and for moving said scanning tip orthogonal to the surface to follow the contours of the surface;
   d. beam positioning means for directing said radiant energy beam to follow said sensing probe through lateral motion of said probe; and
   e. detector means adapted to receive the energy beam reflected from said reflective surface and operable in response to movement of said reflected energy beam corresponding to position changes of said sensing probe relative to the surface to be scanned to produce a motion representing signal corresponding to tip movement following the contours of the scanned surface,
   whereby tip motion in a direction orthogonal to scanning motion results in a series of electrical signals corresponding to and representative of the surface contours of the scanned surface.

2. In a scanning force microscope having a sensing lever having a tip mounted for movement in response to relative vertical distance changes between the tip and a sample surface as the tip moves laterally with respect to the sample surface, apparatus for sensing the vertical movement of the tip relative to the surface being scanned and for creating a signal representative of such vertical movement comprising:
   a. a reflective surface carried by the sensing lever;
   b. an energy source positionally decoupled from lateral movement of the sensing lever for emitting a radiant energy beam including focussing means for applying said beam to said reflective surface;
   c. control means for moving the sensing lever and tip laterally over the surface of a sample to be scanned including
   beam directing means for causing said radiant energy beam to follow the lateral motion of the sensing lever;
   d. driving means for moving the sensing lever and tip in a vertical direction towards and away from the surface of the sample to be examined; and
   e. detection means positioned to receive said energy beam after reflection from said reflective surface for signalling changes in the beam position, said changes corresponding to and being representative of vertical displacement of the sensing lever tip during lateral motion over the sample surface.

3. The scanning force microscope of claim 2, further including means for creating an image of the lever in space at a point in space such that said image does not appear to move when the lever is moved laterally.

4. The scanning force microscope of claim 2 further including a lens system attached to a deformable ceramic transducer having an axis to create an image of the lever substantially at a selected point along the axis of said transducer at which the lever image appears to be stationary, notwithstanding lateral movement of the lever.

5. The scanning force microscope of claim 2 wherein said detection means are isolated from and independent of lever tip movement, said detection means being responsive to the light beam reflected from said reflective surface for signalling changes in light beam position resulting from bending movement of the sensing lever, whereby detection mean output signals correspond to and are representative of the vertical motion of the sensing lever tip and represent the contours of a scanned surface.

6. The scanning force microscope of claim 2 wherein detection means output signals are processed to produce control signals which correspond to and are representative of the contours of a scanned surface.

7. In a scanning force microscope having a lever with a reflecting surface and a sensing tip wherein the sensing tip is responsive to forces resulting from the proximity of the sensing tip to a sample surface under investigation, apparatus for sensing the response of the tip to the forces comprising:
   a. a light beam source for generating a light beam, said source being mounted to permit relative lateral motion between said source and the lever during scanning;
   b. a light beam steering device for laterally steering said light beam to follow the reflective surface of said lever as said lever moves relative to said light beam source;
   c. a motion control device for creating relative motion between said sensing tip and said sample surface; and
   d. a detection device for detecting light reflected from said lever.

8. The microscope of claim 7 wherein the light beam source is a laser.

9. The microscope of claim 7 further including at least one lens interposed between the light beam source and said reflective surface wherein said beam steering device comprises a free end and a fixed end, said free end being coupled to said lens.

10. The microscope of claim 7 further including at least one mirror interposed between the light beam source and said reflective surface wherein the beam steering device comprises a free end and a fixed end, said free end being coupled to said mirror.

11. The microscope of claim 7 wherein a wedge shaped optical element is interposed between the light beam source and said reflective surface.

12. The microscope of claim 7 wherein said motion control device includes a piezo-electric device having a free end and a fixed end, said free end of said motion control device being adapted to provide relative scanning motion between said tip and the sample surface under investigation.

13. The microscope of claim 7 wherein said detection device is an array of at least two photodiodes.

14. The microscope of claim 7 wherein the sensing tip is in contact with the sample surface under investigation.

15. The microscope of claim 7 wherein said detection device is adapted to create an error signal which can be used in conjunction with applied position signals to create a three dimensional map of said sample surface.

16. The microscope of claim 7 wherein said detection device generates an error signal which is processed to create a control signal to be used in conjunction with applied position signals to create a three dimensional map of the sample surface.

17. The microscope of claim 4 wherein said light beam steering device is integral with said motion control device.

18. In a scanning force microscope having a lever with a reflecting surface and a sensing tip wherein the sensing tip is responsive to forces resulting from the proximity of the sensing tip to a sample surface under investigation, apparatus for sensing the response of the tip to the forces comprising:

a. a light beam source for generating a light beam;

b. a motion control device for creating relative motion between the sensing tip and the sample surface, said motion control device having a fixed end and a free end, said free end being adapted to provide relative scanning motion between the scanning tip and the sample surface;

c. at least one lens interposed in said beam of light between said source and the reflecting surface, said lens fixed to the frame of reference of said free end of said motion control device such that said lens causes said beam to track laterally the motion of said reflecting surface; and d. a detection device for detecting light reflected from the reflecting surface.

19. The microscope of claim 18 wherein said light beam source is a laser.

20. The microscope of claim 18 wherein said detection device is an array of at least two photodiodes.

21. The microscope of claims 18 wherein the sensing tip is in contact with the sample surface under investigation 22. The microscope of claim 18 wherein a wedge shaped optical element is interposed between the light beam source and said reflective surface.

23. The microscope of claim 18 wherein said detection device is adapted to create an error signal which can be used with applied position signals to create a three dimensional map of the sample surface.

24. The microscope of claim 18 wherein said detector generates a signal which is processed to create a control signal to servo said motion control device, wherein said control signal is further used in conjunction with applied position signals to create a three dimensional map of the sample surface.

25. The microscope of claim 18 further including at least one mirror interposed between the light beam source and said reflective surface wherein the beam steering device comprises a free end and a fixed end, said free end being coupled to said mirror.

26. The microscope of claim 18 wherein at least said one lens is fixed to the frame of reference of the free end of said motion control device.

27. The method of operating a scanning force microscope having a probe with a lever having a reflecting surface and a sensing tip responsive to forces resulting from the proximity of the tip to a sample surface under investigation wherein said probe is scanned across a surface, and wherein the scanning force microscope further has a light beam source for generating a light beam wherein the light beam source does not move with the scanning probe during scanning, the method comprising the steps of:

a. steering the light beam to follow the motion of the sensing probe;

b. reflecting the light beam from the reflecting surface; and c. detecting the light beam reflected from the moving probe with a detector.

28. The method of claim 27 including the further step of bringing the sensing tip into contact with the surface of the sample.

29. The method of claim 27 including the further step of processing the signal generated from the detection of the reflected beam, to generate a control signal which is transmitted to a translation device which causes said sensing tip to move.

30. The method of claim 27 including the further step of generating an image from the control signal.

31. The method of claim 23 to further include the step of generating an image from an error signal representing the difference of the detector output and a predetermined set point.

* * * * *